United States Patent
Sharifzadeh Behzadi

(10) Patent No.: US 10,343,466 B2
(45) Date of Patent: Jul. 9, 2019

(54) METHOD AND APPARATUS FOR CREATING A VACUUM BETWEEN VEHICLE TIRES AND ROAD SURFACE IN ORDER TO ENHANCE TRACTION

(71) Applicant: Hamed Sharifzadeh Behzadi, Kerman (IR)

(72) Inventor: Hamed Sharifzadeh Behzadi, Kerman (IR)

(73) Assignee: Hamed Shrifzadeh Behzadi, Kerman (IR)

( * ) Notice: Subject to any disclaimer, the term of this patent is extended or adjusted under 35 U.S.C. 154(b) by 252 days.

(21) Appl. No.: 15/256,670

(22) Filed: Sep. 5, 2016

(65) Prior Publication Data

US 2018/0065425 A1    Mar. 8, 2018

(51) Int. Cl.
*B60C 19/00*    (2006.01)
*B60C 11/03*    (2006.01)
*B60C 11/00*    (2006.01)

(52) U.S. Cl.
CPC .............. *B60C 19/00* (2013.01); *B60C 11/00* (2013.01); *B60C 11/032* (2013.01)

(58) Field of Classification Search
CPC .... B60C 19/00; B60C 11/032; B60C 11/0323
See application file for complete search history.

(56) References Cited

U.S. PATENT DOCUMENTS

| | | | |
|---|---|---|---|
| 3,628,625 A | 12/1971 | Boyles, Jr. | |
| 3,768,599 A | 10/1973 | Alexandre et al. | |
| 4,044,862 A | 8/1977 | Savarimuthu | |
| 4,699,252 A | 10/1987 | Sing | |
| 4,896,749 A | 1/1990 | Walker | |
| 6,336,515 B1 | 1/2002 | Secondari | |
| 2011/0017538 A1 | 1/2011 | Baumann | |

FOREIGN PATENT DOCUMENTS

| | | | |
|---|---|---|---|
| DE | 10107967 | * | 8/2002 |
| DE | 102005024996 | * | 12/2006 |
| FR | 2785231 | * | 5/2000 |
| JP | 2006-151354 | * | 6/2006 |

OTHER PUBLICATIONS

English machine translation of DE102005024996. (Year: 2006).*
English machine translation of DE10107967. (Year: 2002).*

* cited by examiner

*Primary Examiner* — Robert C Dye

(57) ABSTRACT

An apparatus to reduce skidding of a vehicle tire on the road surface, creates a vacuum between the tire and the road surface when the wheels slip, especially during heavy braking. A number of conduits are attached to the inner side of the tire, each of them extended from a hole in the rim to some of the tread voids. A vacuum head is placed in contact with the rim and sweeps the perforated part of the rim as the wheel rotates. The vacuum head sucks air from the only voids which are precisely in the road contact area, through some of the conduits. A special tread pattern closes off these voids with respect to the ambient atmosphere.

7 Claims, 6 Drawing Sheets

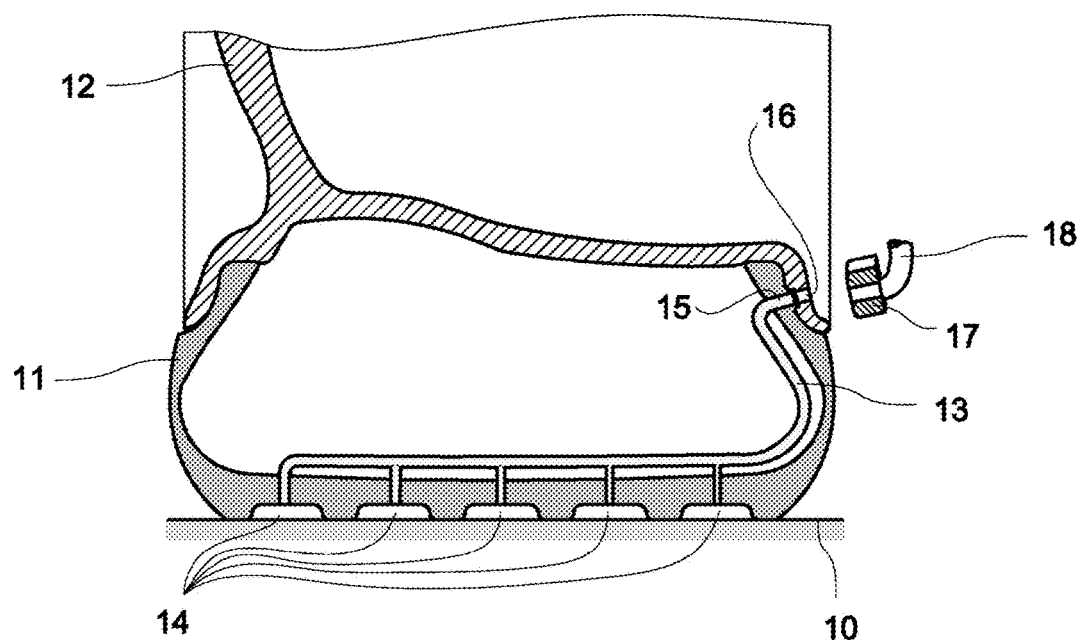
FIG. 1-a

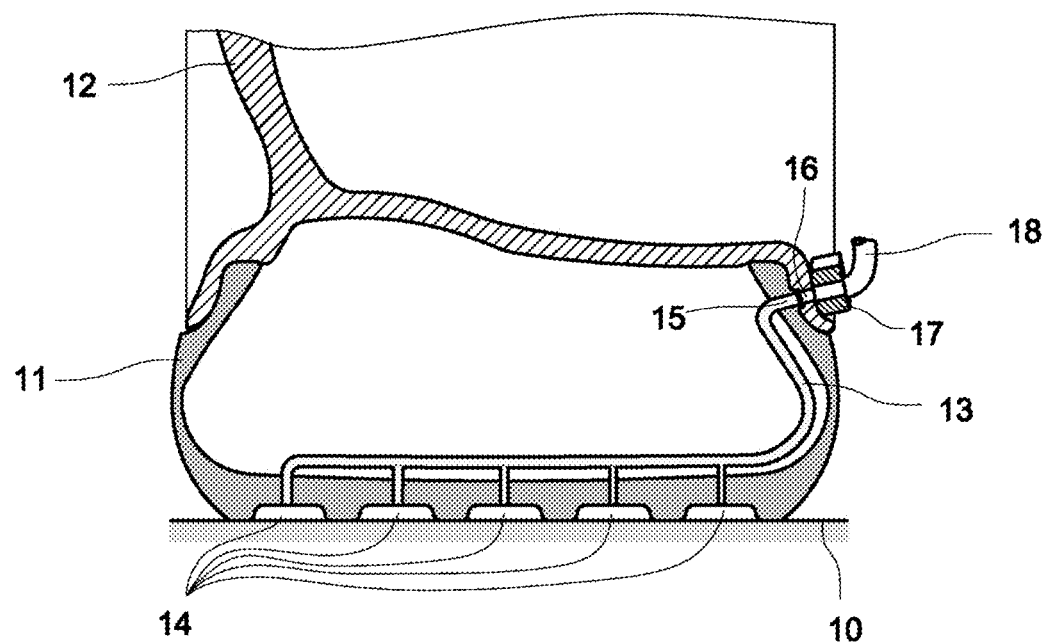
FIG. 1-b
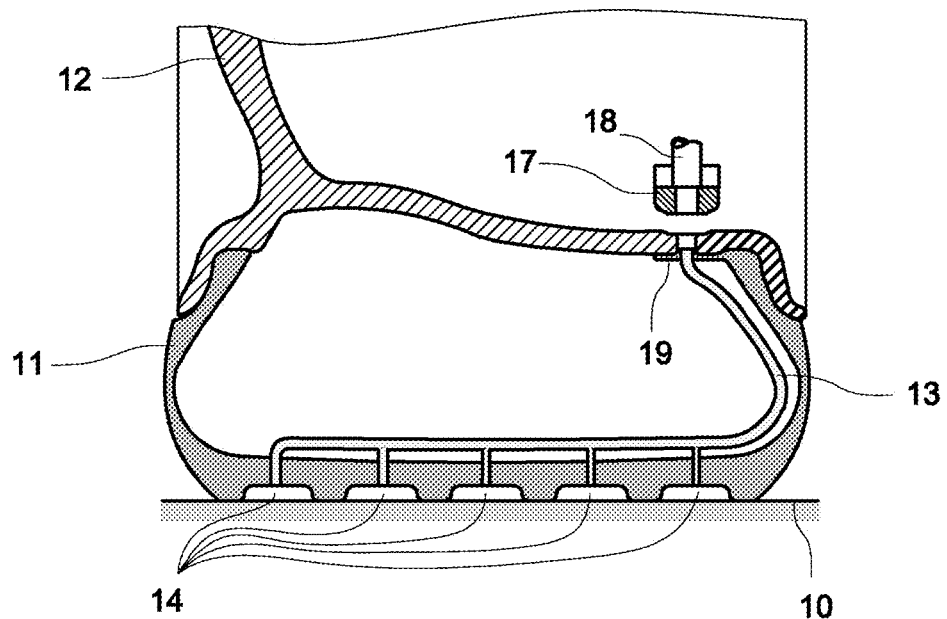
FIG. 2-a

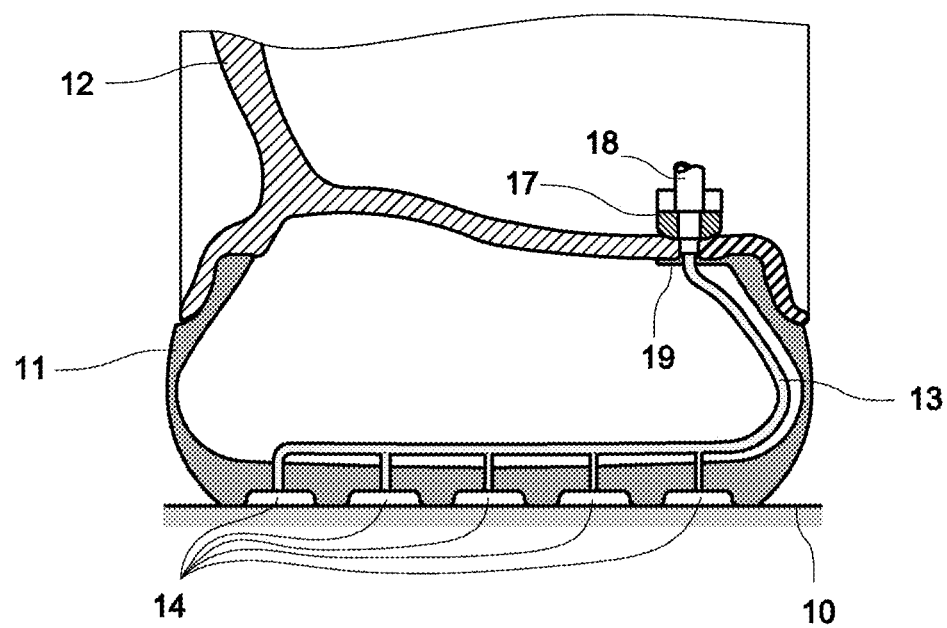
FIG. 2-b

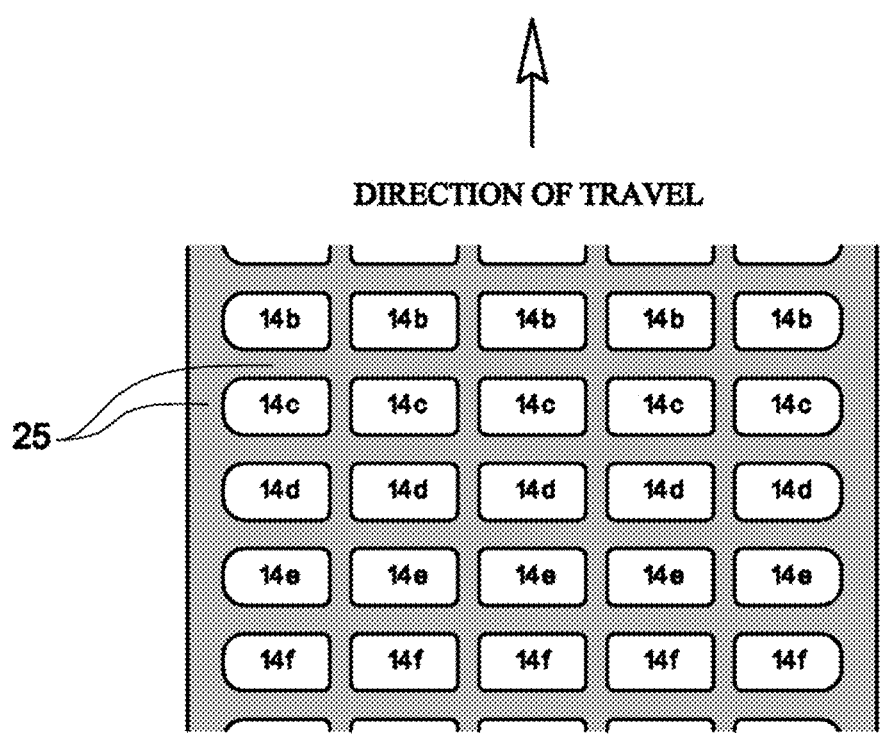
FIG. 4-a

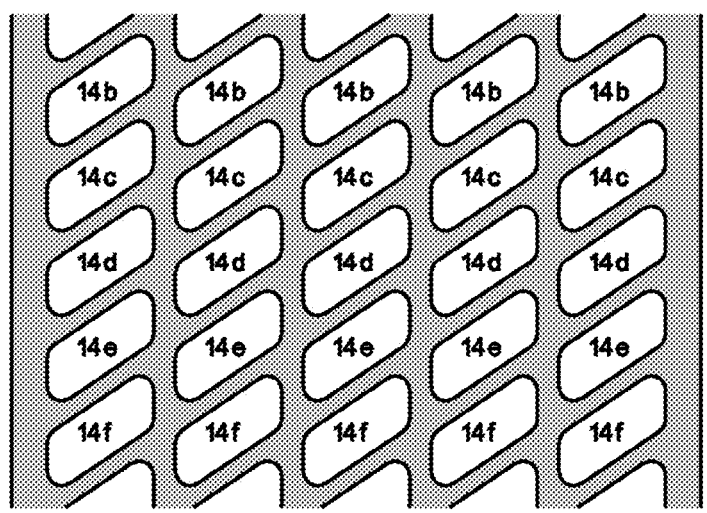
FIG. 4-b

METHOD AND APPARATUS FOR CREATING A VACUUM BETWEEN VEHICLE TIRES AND ROAD SURFACE IN ORDER TO ENHANCE TRACTION

BACKGROUND OF THE INVENTION

When driving on sharp bends at high speed and/or during heavy braking, it is perfectly possible for the tires to skid on the ground and this causes the driver to lose control of the vehicle. If the ground surface is wet or frozen, this possibility becomes stronger; therefore, enhancing the traction is a need for approved safety. Developments in tires and road services have sought to optimize the tire-road friction coefficient. On the other hand, there have been some efforts over the years to improve vehicle traction and braking capability by means of increasing the normal loading on the tires without increasing the total vehicle mass.

Several suggestions have been made to employ vacuum-type devices in order to increase normal force in some patents such as U.S. Pat. No. 6,336,515, US2011/0017538A1, U.S. Pat. No. 3,628,625, 3,768,599, 4,044,862, 4,699,252, and 4,896,749. In nearly all of them, a piece having a chamber attached to the vehicle is placed in contact with or close to the road surface and the air contained in the said chamber is evacuated in an emergency. So, the generated vacuum creates a load which is transmitted to the vehicle and increases the traction of the vehicle; or generates an additional braking force during the braking operation.

Unfortunately, these systems suffer from many disadvantages. Many of them are useful only when braking and have no effect on the traction of the vehicle when no braking operation is carried out; and the others have limited ground clearance problems. Some of them transmit high forces into the suspension and many of them require large installations. These disadvantages are to be solved in the present invention.

SUMMARY OF THE INVENTION

The main object of this invention is to increase the traction of a wheel-supported vehicle such as an automobile, especially a sports car or a police car in emergencies through applying a vacuum to the area of the tire that is in contact with the road at a given instant in time, usually known as contact patch. In other words, a vacuum is generated in enclosed spaces in the tread voids when they pass through the contact patch and the generated vacuum presses the tire onto the road, resulting in improved traction. The tread pattern is designed such that the vacuum is maintained in the voids located in the contact patch during the operation of the system, while the tire performance is not impaired during the normal operation of the vehicle.

When the system is activated, a vacuum head comes in contact with a perforated rim in a fixed position and a vacuum is generated in the vacuum head. A number of conduits are fixed to the inner side of the tire extended from the rim holes to the tread voids; but a few of them are open to the vacuum head at any instant and therefore air is sucked from them through the vacuum head. The vacuum head is placed where the conduits from which air is sucked, lead into the voids traveling through the contact patch. Therefore these conduits transmit the vacuum only to the mentioned voids.

During the braking operation, if a slip occurs between the tire and the road, the system of the invention can be activated automatically resulting in higher contact forces between the wheels and the road surface; therefore, additional braking force can be generated, which advantageously shortens a braking distance of the vehicle. The system can be activated when increased traction is necessary even if no braking operation is carried out, for example when accelerating on slippery surfaces or extreme cornering. In such circumstances, the mechanism can be activated automatically for example by a wheel slip detection system or manually by a switch.

One advantage of the present invention is that during the operation of the system, nothing comes into contact with the road more than the wheels. Also, the weight of the vehicle helps to seal off the voids acted upon by a vacuum, with respect to the environment. Another advantage of this invention is that the forces generated by the vacuum act on the wheels directly and no additional significant load is applied to the suspension.

BRIEF DESCRIPTION OF THE DRAWINGS

FIGS. 1-a, b are schematic partial cross-sectional views of a wheel along with a vacuum head according to a first embodiment of the invention. The vacuum head is placed in an inoperative position in FIG. 1-a while in an operative position in FIG. 1-b FIGS. 2-a, b are schematic partial cross-sectional views of a wheel along with a vacuum head according to a second embodiment of the invention. The vacuum head is placed in an inoperative position in FIG. 2-a while in an operative position in FIG. 2-b

FIGS. 4-a, b are the tread patterns on the tire according to this invention. The pattern of FIG. 4-b makes less noise than the pattern of FIG. 4-a.

DETAILED DESCRIPTION OF THE INVENTION

Figure 3:
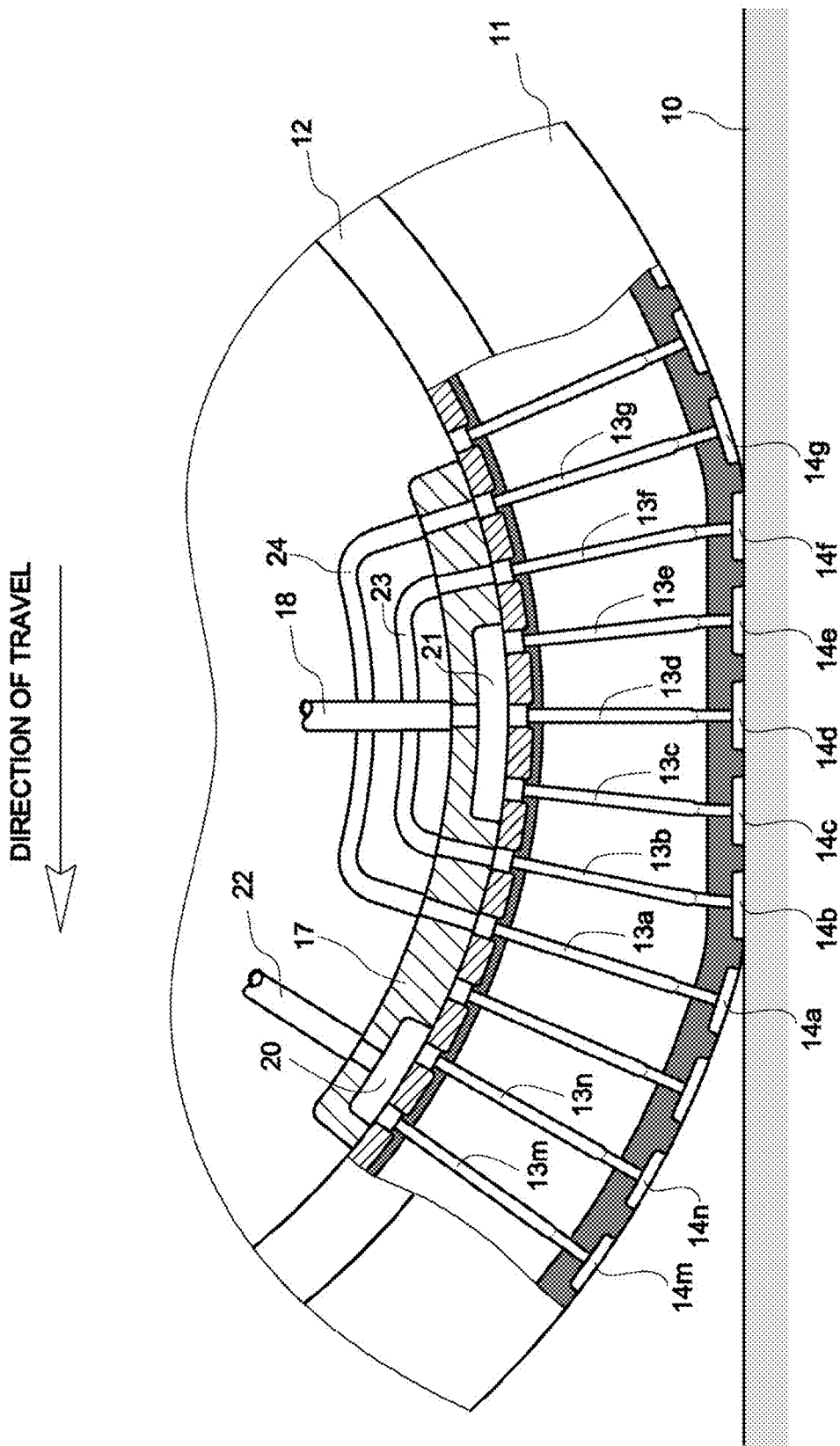
FIG. 3 is a schematic partial view of the wheel of FIG. 2-b from the back or inner side of the wheel; while the tire is partially cut away, so that inside the tire can be seen.

The system of this invention is operated in wheel-supported vehicles when increased traction is necessary and generates a vacuum between the tire and the road whereas in normal circumstances, the system is deactivated and has no effect on tire performance. During the braking operation, if the anti-lock braking system is activated, it means that the friction between the tire and the road is less than the extent that provides the driver's expected braking force.

In these circumstances in order to increase friction, the system of the invention can be activated automatically together with the anti-lock braking system. In addition, when no braking operation is carried out, if there is a risk of slipping, for example when the road is slippery or during extreme cornering, the system of the invention can be activated automatically for example by a wheel slip detection system or manually by a switch. For example, if the vehicle approaches the corner of a road at high speed, the driver can activate the system before the corner and deactivate it again after turning the corner.

More features of the invention will become apparent from the following description of the invention when considered in conjunction with the accompanying drawings.

FIG. 1-a is a schematic partial cross-sectional view of a rim 12 and a tire 11 placed on the road surface 10, along with a vacuum head 17 according to the invention while the vacuum head 17 is placed in an inoperative position. A number of tire holes 15 are placed in a sidewall of the tire 11 within the portion in contact with the rim 12, whereas the perforated sidewall of the tire 11 is placed towards the back or inner side of the wheel. The same number of relatively flexible conduits 13 are arranged inside the tire 11, each of them connected to a tire hole 15 and divided into some branches which open into the voids 14 (the tread pattern will be described).

Only one of the conduits 13 and one of the tire holes 15 are illustrated in FIG. 1-*a*. There is a rim hole 16 in the rim 12 axially aligned with each tire hole 15 in the tire 11. A section of a vacuum head 17 is shown schematically in an inoperative position, close to but not in contact with the perforated part of the rim 12. When the system is activated, the vacuum head 17 is moved slightly from its inoperative position into the operative position in contact with the rim 12 as shown in FIG. 1-*b* (the devices by which the vacuum head 17 is moved are not shown).

The vacuum head 17 does not rotate together with the wheel, therefore during a complete rotation of the wheel the perforated part of the rim 12 is swept by the vacuum head 17. However at any point in time, one or a small number of the conduits 13 are open to the vacuum head 17 and lead into the enclosed spaces in some of the voids 14 located in the contact patch (described in more detail in the description of FIG. 3). On the other hand, a vacuum is generated and transmitted through a vacuum conduit 18 (such as a hose) to the vacuum head 17.

Consequently the vacuum is transmitted through one or more conduits 13 to the enclosed spaces between the tire 11 and the road surface 10, resulting in increased traction. The created vacuum also presses the vacuum head 17 slightly onto the rim 12 resulting in improved sealing. It is worth noting that the vacuum head 17 can be located in its position of FIG. 1-*b* in an inoperative condition, too; provided that the continuous friction between the vacuum head 17 and the rim 12 does not create a problem.

In this case, the devices utilized for the displacement motion of the vacuum head 17 are removed. A proper coating on the rim 12 can prevent wear or air leakage.

The vacuum can be generated for example by one or more vacuum pump (not shown) which can be powered by the engine or a separate motor. Given that the required vacuum is partly dependent on the rotational speed of the wheels, the mentioned vacuum pump can be powered by a rotating component after the transmission such as a drive shaft.

A vacuum reservoir tank (not shown) may be connected with the vacuum conduit 18 to provide sufficient vacuum at the first moments of the operation of the invention system. Material, wall thickness and diameter of the conduit 13 are such that the conduit 13 does not collapse as a result of air pressure in the tire 11 and the vacuum in the conduit 13. Also, the conduit 13 may have a flexible construction because it bends slightly in each rotation of the tire 11 especially at low inflation pressures and also given the possibility of puncturing.

Thus the conduit 13 may be a flexible hose of polymeric material, reinforced for example with circumferential or helical metal rings. The tire hole 15 may be supported for example by a metal ring (not shown) inserted into the tire hole 15 or into the conduit 13 at the connection point with the tire 11. Also, the holes in the tread face of the tire 11 through which the branches of the conduit 13 open into the voids 14, may be supported in such a manner. By shortening the branches of the conduit 13, it is placed in a closer position to the inner surface of the tire 11, to the extent that the conduit 13 can come in contact with the inner surface of the tire 11 and then by fixing the conduit 13 to the inner surface of the tire 11, any displacement of the conduit 13 relative to the tire 11 can be prevented; therefore, the tire 11 can hold its balance.

FIGS. 2-*a*, *b* show another embodiment of the invention. The vacuum head 17 shown in FIG. 2-*a* is in an inoperative position, close to but not in contact with the rim 12, whereas in FIG. 2-*b* the vacuum head 17 is shown in an operative position in contact with the rim 12. Also, both the operative position and the inoperative position of the vacuum head 17 can be such as shown in FIG. 2-*b*.

In this embodiment, a circular band 19 is added to the tire 11 and is put around the bed of the rim 12. A cross section of the band 19 is shown in FIGS. 2-*a*, *b*. Corresponding to each tire hole 15 shown in FIGS. 1-*a*, *b*; there is a hole in the band 19 shown in FIGS. 2-*a*, *b*; so that the conduits 13 are connected to these holes in the band 19, each of these holes aligned with a hole created in the rim 12.

The vacuum head 17 is positioned close to perforated part of the rim 12, but does not rotate with the wheel. Thus without the need to hole the side wall of the tire 11 within the small area in contact with the rim 12, the same performance of the first embodiment shown in FIGS. 1-*a*,*b* is achieved. The initial circumference of the band 19 may be slightly smaller than its final circumference after installation on the rim 12 so that it can be slightly stretched to prevent air leakage.

FIG. 3 is a schematic partial view of the wheel of FIG. 2-*b* from the back or inner side of the wheel. The rim 12 and the tire 11 are partially cut away and the vacuum head 17 is shown in section. A number of conduits 13 (*a, b, c* . . . ) inside the tire can be seen, which lead into the tread voids 14(*a, b, c* . . . ). A small portion of the tire 11 that makes contact with the road surface 10 at a given instant—usually known as contact patch—becomes flat because of the weight of the vehicle; and a small number of the voids 14(*a, b, c* . . . ) which are located in this portion, form some small spaces between the tire 11 and the road surface 10 and are closed off with respect to the ambient air.

The vacuum head 17 is in contact with the rim 12 such that one or some of the conduits (13*c*, 13*d*, 13*e* at the instant shown) can open into the vacuum chamber 21, and lead into all or some of the enclosed spaces (voids) between the tire 11 and the road surface 10 in some of the voids (14*c*, 14*d*, 14*e* at the instant shown). Air is sucked from the chamber 21 through main vacuum conduit 18, and so a vacuum is generated and transmitted to the said enclosed spaces and this, results in a higher contact force between the tire 11 and the road surface 10. During the rotation of the wheel, the vacuum head 17 remains fixed and the conduits 13 (*a, b, c* . . . ) move, but always the conduits 13 (*a, b, c* . . . ) from which air is sucked out, lead into the contact patch.

The area of the contact patch varies depending on a number of different factors such as the forces acting on the tire 11 or the inflation pressure. On the other hand, the larger the surface to which a vacuum is applied, the greater the generated vacuum force. Thus, in order to increase the efficiency of the present invention, some characteristics of the tire 11 such as its width or proper inflation pressure may be designed such that a larger contact patch can be provided relative to a conventional tire. However, for given said characteristics, the contact patch is still variable because the forces acting on the wheels vary in different conditions.

The first connecting conduit 23 can be embedded in the vacuum head 17 to have some useful functions, when the contact patch is larger than the area acted upon by a vacuum through the vacuum chamber 21. For the conditions of FIG. 3, if voids 14*b*, 14*f* are closed off with respect to the environment, conduit 13f and voids 14f from which air was formerly sucked out through the vacuum chamber 21, after rotation of the wheel through a very small angle, at the instant shown, are connected with conduit 13b through the first subsidiary connecting conduit 23.

Therefore, the air contained in conduit 13b and voids 14b partly flows into conduit 13f and voids 14f and this leads to the following results: Firstly, a moment later when conduit 13b opens into the vacuum chamber 21, less power will be required for vacuum generation in conduit 13b and voids 14b. Secondly, the vacuum is applied to a larger part of the contact patch, because the pressure in voids 14b falls at the instant shown in FIG. 3 and this condition can be maintained until conduit 13b opens into the vacuum chamber 21 where more vacuum is generated in voids 14b.

Thirdly, the pressure in voids 14f increases slightly and approaches the ambient pressure, so that at the next moment, it will be easier to separate the tire 11 from the road surface 10. When for any reason the contact patch is relatively small, voids 14b and 14f may be open to the ambient atmosphere. In this case, if at the moment shown in FIG. 3, voids 14b and 14f led directly into the vacuum chamber 21, the ambient atmosphere would gain access to the vacuum chamber 21 and then to the entire contact patch; resulting in reduction in the efficiency of the system.

The second connecting conduit 24 can be embedded in the vacuum head 17 to have similar functions to the first connecting conduit 23. When the contact patch is larger and voids 14a, 14g are closed off with respect to the environment, the second connecting conduit 24 plays its role and thus the surface to which a vacuum is applied, becomes larger. One or more conduits such as the first and second connecting conduits 23, 24 can be added to the vacuum head 17 based on need.

The discharge conduit 22 is connected to a discharge chamber 20 within the vacuum head 17. The air coming from a pump outlet or an exhaust gas of the engine is discharged at a pressure into the discharge conduit 22 and the chamber 20 and passes through one or some of the conduits (13m, 13n at the instant shown) into the connected voids (14m, 14n at the same instant) that are to enter the contact patch.

This can result in taking any potential congestion ranging from debris, mud, water, etc out of the conduits 13 (a, b, c . . . ). In addition, the road surface 10 onto which the tire 11 will roll is partially cleaned. In another embodiment, the chamber 20 can be positioned after the vacuum chamber 21. It is worth mentioning that some parts of the vacuum head 17 shown in FIG. 3, such as discharge conduit 22 and the first and second connecting conduits 23, 24, are not shown in FIGS. 1-a,b, 2-a,b.

In another embodiment (not shown), some components of a braking system are combined with some components of the present invention. For example in a drum brake, the brake shoe can also function as the vacuum head 17, and the drum can also function as the perforated part of the rim 12, whereas the drum is perforated and attached to the rim 12, or the perforated part of the rim 12 can function as the drum. For another example in a disc brake, the brake pad can also function as the vacuum head 17, and the disc can also function as the perforated part of the rim 12, whereas the vacuum can be transmitted through some cavities or conduits within the disc, the hub and the rim 12 to some of the conduits 13 appropriately. In this embodiment, if the system is activated to increase traction when no braking force is needed, a control system applies the brakes automatically in such a way that no considerable braking force is produced.

FIG. 4-a is an appropriate tread pattern according to this invention and in other words, shows the footprint of an appropriate tire according to the invention, on the road. The ribs 25 form the portion of the tread that comes in contact with the road, shown as dark areas. These ribs 25 are designed in such a manner that the voids 14 ( . . . , b, c, d . . . ) can be separated from each other. Each branch of the conduits 13 (a, b, c . . . ) illustrated in FIG. 3 leads into one of the voids 14 ( . . . , b, c, d . . . ) in FIG. 4-a, and the voids 14 ( . . . , b, c, d . . . ) which are arranged in a row, are connected to the branches of one of the conduits 13 (a, b, c . . . ) shown in FIG. 3. So, for example, each of the voids 14b in FIG. 4-a is connected with the conduit 13b in FIG. 3 through a branch.

In a conventional tire, the tread is designed such that it has no enclosed voids similar to the voids 14 ( . . . , b, c, d . . . ) because when the wheel passes over wet surfaces, the pressure in such enclosed voids increases causing the tire to slip. However this effect—known as hydroplaning—does not occur in the present invention because each of the voids 14 ( . . . , b, c, d . . . ) is connected to a conduit 13 (a, b, c . . . ) in FIG. 3 causing a vacuum to be created in the voids 14 ( . . . , b, c, d . . . ) which are located in the contact patch during the operation of the system. In the inoperative condition the voids 14 ( . . . , b, c, d . . . ) lead into the ambient atmosphere through the conduits 13 (a, b, c . . . ) shown in FIG. 3.

FIG. 4-b shows another appropriate tread pattern according to this invention. Those ribs 25 positioned horizontally in FIG. 4-a, are arranged diagonally in FIG. 4-b and this leads to elimination of potential noises caused by horizontal ribs. It is clear that much more patterns can be designed according to the invention. For example, those ribs 25 which are positioned horizontally in FIG. 4-a and diagonally in FIG. 4-b, may have a zigzag pattern in another design could be of circular shape, star, rectangle or other geometric or non-geometric design. Obviously the branches of each one of the conduits 13(a, b, c . . . ) of FIG. 3 are connected to a horizontal row specified in FIG. 4-b by a letter of the alphabet.

It will be apparent to those skilled in the art that variation or changes in the embodiments illustrated and described herein may be made without departure from the present invention. For example, this invention is applicable to some air vehicles to shorten the braking distance when landing.

The invention claimed is:

1. A traction enhancement system for reducing skidding of vehicle tires, comprising:
   a rim;
   multiple rim holes;
   a tire having a specific tread pattern, the tire comprising:
     multiple voids on a periphery of the tire; and
     multiple tire holes on an internal area of the tire, wherein:
       the multiple tire holes face the rim;
       the multiple tire holes are located on an opposite side than the multiple voids; and
       the multiple tire holes are adjacent to the multiple rim holes;
   a vacuum head; and
   multiple flexible conduits extending between the multiple tire holes and the multiple voids, wherein each flexible conduit of the multiple flexible conduits divides into multiple branches ending in a set of voids of the multiple voids, wherein:
     the traction enhancement system creates a vacuum between the tire and a road surface;

during an inoperative position when the traction enhancement system is not active, the vacuum head is in close proximity but not in contact with the multiple rim holes; and when the traction enhancement system is active, the vacuum head moves and is in contact with the rim and at least one rim hole of the multiple rim holes, which creates a vacuum path from the vacuum head through at least one flexible conduit of the multiple flexible conduits, passing through at least one branch of the multiple branches and ending in at least one void of the multiple voids on the periphery of the tire, which increases traction between the tire and the road surface which prevents the tire from skidding on the road surface.

2. The traction enhancement system of claim 1, wherein:
the vacuum is created via at least one pump; and
the at least one pump is powered by at least one of:
a first engine of a vehicle;
a second motor designed to create the vacuum; or
a drive shaft of a vehicle.

3. The traction enhancement system of claim 2, wherein:
when the traction enhancement system is active, the vacuum head presses tightly onto the rim, around the at least one rim hole of the multiple rim holes, which improves sealing between the rim and the vacuum head.

4. The traction enhancement system of claim 3, wherein the vacuum path is connected to a vacuum reservoir tank.

5. The traction enhancement system of claim 4, wherein:
a material of the multiple flexible conduits, a wall thickness of the multiple flexible conduits and a diameter of the multiple flexible conduits prevent collapse of the multiple flexible conduits.

6. The traction enhancement system of claim 5, wherein:
the multiple tire holes are supported by a metal ring inserted inside layers of the tire and at least one of around the multiple tire holes or around the multiple flexible conduits at a connecting point of the multiple flexible conduits with the tire; and the multiple flexible conduits comprises a reinforcement structure at a circumference of the multiple flexible conduits where the multiple flexible conduits are connected to the multiple voids, which prevents the tire from tearing apart at the connecting point.

7. The traction enhancement system of claim 6, wherein:
the vacuum head does not rotate with the tire such that when the traction enhancement system is activated, at least one flexible conduit of the multiple flexible conduits has the vacuum due to a brief contact between the vacuum head and the multiple rim holes.

* * * * *